(12) United States Patent
Heath et al.

(10) Patent No.: US 6,907,197 B2
(45) Date of Patent: Jun. 14, 2005

(54) METHOD AND APPARATUS FOR MEASURING AND ESTIMATING OPTICAL SIGNAL TO NOISE RATIO IN PHOTONIC NETWORKS

(75) Inventors: Richard W Heath, Harlow (GB); Peter J Anslow, Herts (GB)

(73) Assignee: Nortel Networks Limited, St. Laurent (CA)

( * ) Notice: Subject to any disclaimer, the term of this patent is extended or adjusted under 35 U.S.C. 154(b) by 617 days.

(21) Appl. No.: 09/804,330

(22) Filed: Mar. 12, 2001

(65) Prior Publication Data

US 2002/0154353 A1 Oct. 24, 2002

(51) Int. Cl.[7] .............................................. H04B 10/00
(52) U.S. Cl. ........................................ 398/26; 398/25
(58) Field of Search .............................. 398/9–38, 97, 398/79, 58, 59, 60

(56) References Cited

U.S. PATENT DOCUMENTS

| | | | | |
|---|---|---|---|---|
| 5,297,154 A | * | 3/1994 | Heidemann et al. ............ | 372/6 |
| 5,301,054 A | * | 4/1994 | Huber et al. ................... | 398/66 |
| 5,321,707 A | * | 6/1994 | Huber ............................ | 372/6 |
| 5,712,716 A | * | 1/1998 | Vanoli et al. .................. | 398/34 |
| 6,115,157 A | * | 9/2000 | Barnard et al. ................ | 398/1 |
| 6,215,565 B1 | * | 4/2001 | Davis et al. ................... | 398/27 |
| 6,317,231 B1 | * | 11/2001 | Al-Salameh et al. .......... | 398/34 |
| 6,466,342 B1 | * | 10/2002 | Frigo et al. .................... | 398/82 |
| 6,654,561 B1 | * | 11/2003 | Terahara et al. .............. | 398/26 |

\* cited by examiner

*Primary Examiner*—M. R. Sedighian
*Assistant Examiner*—Agustin Bello
(74) *Attorney, Agent, or Firm*—Barnes & Thornburg

(57) ABSTRACT

A WDM optical network comprising a plurality of nodes has a first apparatus for optical analysis at the site of a first optical amplifier upstream of the first node, a second apparatus for optical analysis at the site of a second optical amplifier at the downstream output of the first node, and a third apparatus for optical analysis at the site of a third optical amplifier further downstream of the first node, where knowledge of the optical sin to noise ratio (OSNR) is desired. The first, second and third apparatus are for measuring the signal level at frequencies both at and in-between the channel frequencies. The signal levels at the channel frequencies and between the channel frequencies at the first, second and third apparatus are used to derive the OSNR at the third apparatus. This enables the OSNR to be measured accurately at any site in the network, using calculations in which noise shaping of the nodes can be factored in to the calculation of OSNR.

17 Claims, 3 Drawing Sheets

METHOD AND APPARATUS FOR MEASURING AND ESTIMATING OPTICAL SIGNAL TO NOISE RATIO IN PHOTONIC NETWORKS

FIELD OF THE INVENTION

This invention relates to performance analysis in optical systems, and particularly to the determination of optical signal to noise ratio at different locations within an optical communications network.

BACKGROUND OF THE INVENTION

Optical signals suffer degradation between the transmitter and receiver from such factors as noise, inter-symbol interference, fiber dispersion, non-linearity of the elements and transmission medium. In addition, in amplified wavelength division multiplexed (WDM) systems, the transmission characteristics vary from one channel to another due to the non-flat gain and noise profile of erbium-doped fiber amplifiers (EDFAs).

Distortion is defined as any inaccurate replication of a signal transmitted over a communication link, and could originate in any network element (NE) along the link. It can be measured by assessing the difference between the wave shape of the original signal and that of the signal at the network element of interest, after it has traversed the transmission link.

In the last decade, transmission rates of data signals have increased progressively, which has led to more complex and less tolerant transmission systems. For transmission at high rates, such as 40 or 80 Gb/s, the distortion of the optical link is a critical parameter. With various types of dispersion shifted fiber, dispersion compensating fiber and dispersion compensating elements that make up a given link, determining the cause of a distortion in the received signal is no longer a simple operation, especially in optical transmission systems with in-line optical amplifiers. System performance degradation caused by noise and optical path distortions are also usually difficult to separate, making the performance evaluation complicated.

In the evaluation of the characteristics of an optical fiber communication system, the optical signal to noise ratio (OSNR) has been used as a parameter for performance evaluation. This parameter is particularly used in networks which utilise optical (photonic) switching arrangements for the routing or forwarding of the user data, as the signals then remain in the optical domain as they traverse the network. The signal to noise ratio is typically determined by analysing the optical spectrum at the location of interest.

The optical switching arrangement in the node of such a network comprises a photonic cross connect, which is an optical switching fabric for selectively routing signals at the inputs to the outputs. The inputs may be provided with individual channels or with grouped bands of channels. In either case, a multiplexing/demultiplexing arrangement is provided between the fiber whiz carries the WDM signal and the cross connect ports.

In such networks, optical noise from spans leading up to a node passes through the node after being shaped by the multiplexers/demultiplexers. Once a noise component has passed through a node, it no longer has a constant slope frequency spectrum. Instead, the noise component follows the shape of the multiplexer/demultiplexer filtering function. However, conventional optical signal to noise ratio measurements rely on the noise having constant slope. One known technique involves measuring the signal level at frequencies on either side of the channel of interest. This signal is considered to comprise only noise—since no signal is intended to be present at these inter-channel frequencies. A constant slope noise floor is assumed across frequency, to interpolate the noise appearing at the channel frequency. This gives an inaccurate indication of the noise level when there has been noise shaping as described above.

Accurate knowledge of the optical signal to noise ratio is, however, required to enable accurate fault finding and analysis.

It has also been proposed to measure OSNR using polarisation extinction techniques. These techniques rely upon the fact that a data signal has a definite polarisation state, whereas noise is distributed over all polarisation states. Signal strength and noise level is thus measured using a polariser. However, it is difficult to achieve sufficient extinction on of the data signal when measuring the much smaller noise level, and the polarisation state of a signal will evolve over time. These aspects make the process complicated and inaccurate.

Time domain distinction techniques have also been proposed, by which the data signal is gated on and off. If the signal is gated sufficiency rapidly (faster than the response time of the Erbium doped fibre amplifiers within the system), the noise will still be present when the signal is turned off, and can therefore be measured in isolation. This enables the noise to be measured at the channel frequency, but requires interruption of the data signal and can not therefore be used in live systems.

There is a need for an accurate OSNR measurement system which can be used during signal transmission, which takes account of noise shaping resulting from optical filtering.

In addition to OSNR, the performance of an optical system is also often defined by a parameter called Q. The Q value (or Q-factor) indicates the 'useful signal'-to-noise ratio of the electric signal regenerated by the optical receiver, and is defined as follows:

$$Q = \frac{\mu_1 - \mu_0}{\sigma_1 + \sigma_2}$$

where $\mu_1$ is the mean value of the '1's, $\mu_0$ is the mean value of the '0's, $\sigma_1$ is the standard deviation of the level of '1's, and $\sigma_0$ is the standard deviation of the level of '0's. These parameters can be understood from looking at the so-called eye diagram, which represents the received signal, time-shifted by integer multiples of the bit period, and overlaid. The eye diagram can be produced on an oscilloscope by applying a baseband signal to the vertical input of the oscilloscope and triggering the instrument time base at the symbol rate. For a binary signal, such an eye diagram has a single 'eye', which is open or closed to an extent determined by the signal degradation. An open pattern is desired, as this provides the greatest distance between signals representing a 1 and those representing a 0. Changes in the eye size indicate inter-symbol interference, amplitude irregularities, or timing problem, such as jitter, depending on the signal that is measured. The value of Q can be used directly to derive the bit error ratio, and various techniques are available for monitoring the Q value.

These techniques require conversion of the signal from the optical to the electrical domain. One preferred technique involves sweeping the decision threshold of the receiver through all voltages from the voltage level corresponding to a zero to the voltage level corresponding to a one. For example, when the decision threshold is near the zero voltage level, there will be no errors in interpreting a "1", even if there is significant distortion. There will, however be a greatly increased error ratio in interpreting the zeros. The Bit Error Ratio (BER) is measured for each decision threshold voltage, and by mapping the BER values using an appropriate function, a straight line extrapolation can be used to obtain the Q value.

This Q value provides au extremely useful measurement tool, for example for locating errors in the network, which manifest themselves as a step change in Q value, but which may not be detectable by other techniques, for example errors resulting from channel crosstalk. A problem arises that Q cannot be measured without opto-electric conversion circuitry, and cannot be measured at amplifier sites without providing additional circuitry.

SUMMARY OF THE INVENTION

According to a first aspect of the invention, there is provided a WDM optical network comprising a plurality of nodes, each node comprising an optical device at which multiplexing and/or demultiplexing operations are carried out, one or more optical amplifiers being provided between adjacent pairs of nodes, wherein a first apparatus for optical analysis is provided at the site of a first optical amplifier upstream of the first node, a second apparatus for optical analysis is provided at the site of a second optical amplifier at the downstream output of the first node, and a third apparatus for optical analysis is provided at the site of a third optical amplifier further downstream of the first node, where knowledge of the optical signal to noise ratio (OSNR) is desired, wherein the first, second and third apparatus are for measuring the signal level at frequencies both at and in-between the channel frequencies, and wherein signal levels at the channel frequencies and between the channel frequencies at the first, second and third apparatus are used to derive the OSNR at the third apparatus.

This rework enables the OSNR to be measured accurately at any site in the network, using calculations in which noise shaping of the nodes can be factored in to the calculation of OSNR. The noise shaping influence of the nodes is determined using analysis of the signals at amplifier sites upstream and downstream of the nodes.

The change in optical signal to inter-channel noise ratio (OSINR) between the first, second and third apparatus may be used to derive the OSNR at the third apparatus.

The optical device may comprise an optical switching arrangement for the routing or forwarding of channels or groups of channels.

Each optical amplifier in the network may be provided with apparatus for optical analysis, and wherein the noise shaping of all nodes is determined from the apparatus for optical analysis at the amplifier sites immediately upstream and downstream of each node. This enables the noise shaping throughout the network to be determined.

The amplifier sites immediately upstream and downstream of a node may comprise part of the node—for example the preamplifier and postamplifier of the node.

Each apparatus for optical analysis may comprise a tuneable filter and a signal measurement circuit.

Each node may also be provided with apparatus for measuring a Q value of the optical signal. The nodes will use transponders, for wavelength shifting, regeneration, or for reading header data, and the Q measurement circuit may be associated with these transponders. The network may then enable the Q value to be calculated at each amplifier site using the measured Q values at the nodes in combination with the signal to noise ratios for the amplifier sites and the node sites. This enables the Q value to be obtained at all locations in the network including the amplifier sites, without requiring opto-electronic conversion at the amplifier sites.

According to a second aspect of the invention, there is provided a method of determining the optical signal to noise ratio at a location in a WDM optical network, the network comprising a plurality of nodes comprising an optical switching arrangement for the routing or forwarding of channels or groups of channels, the method comprising:

measuring the optical signal levels at channel frequencies and at inter-channel frequencies upstream of each node;

measuring the optical signal levels at channel frequencies and at inter-channel frequencies downstream of each node;

measuring the optical signal levels at channel frequencies and at inter-channel frequencies at the desired location; and determining the signal to noise ratio at the desired location using the measured values thereby taking into account the noise shaping of the nodes.

The optical signal to inter-channel noise ratio (OSINR) is preferably obtained upstream of each node, downstream of each node and at the desired location, and the signal to noise ratio is determined at the desired location using the OSINR values.

According to a third aspect of the invention, there is provided an optical node for use in a WDM optical network comprising a multiplexing and/or demultiplexing device, the node including a first optical amplifier at an input to the node and a second optical amplifier at an output of the node, wherein a first apparatus for optical analysis is provided at the site of the first optical amplifier and a second apparatus for optical analysis is provided at the site of the second optical amplifier, wherein the first and second apparatus are for measuring the signal level at frequencies both at and in-between the channel frequencies, and wherein outputs of the first and second apparatus are provided as outputs of the node for enabling the OSNR to be determined at a location downstream of the node, taking into account the noise shaping of the multiplexing and/or demultiplexing device of the node.

According to a fourth aspect of the invention, there is provided an apparatus for measuring the optical signal to noise ratio at a location in a WDM optical network, the network comprising a plurality of nodes, each node comprising a multiple and/or demultiplexing device, the apparatus comprising:

an input for receiving signal level data at frequencies both at and in-between the channel frequencies for locations immediately upstream and downstream of each node in the path of the optical signal and at the location at which the optical signal to noise ratio is to be measured;

a processor for processing the inputs to determine the OSNR at the location, taking into account the noise shaping of the multiplexing and/or demultiplexing device of the nodes in the path of the optical signal.

According to a fifth aspect of the invention, there is provided a network management system for determining the optical signal to noise ratio at locations in a WDM optical network, the network comprising a plurality of nodes, each node comprising a multiplexing and/or demultiplexing device, the system comprising:

an input for receiving signal level data at frequencies both at and in-between the channel frequencies for locations immediately upstream and downstream of each node in the network and at locations at which the optical signal to noise ratio is to be measured;

a processor for processing the inputs to determine the OSNR at the locations, taking into account the noise shaping of the multiplexing and/or demultiplexing device of the nodes.

BRIEF DESCRIPTION OF THE DRAWINGS

Examples of the invention will now be described in detail with reference to the accompanying drawings, in which.

DETAILED DESCRIPTION

Figure 1:
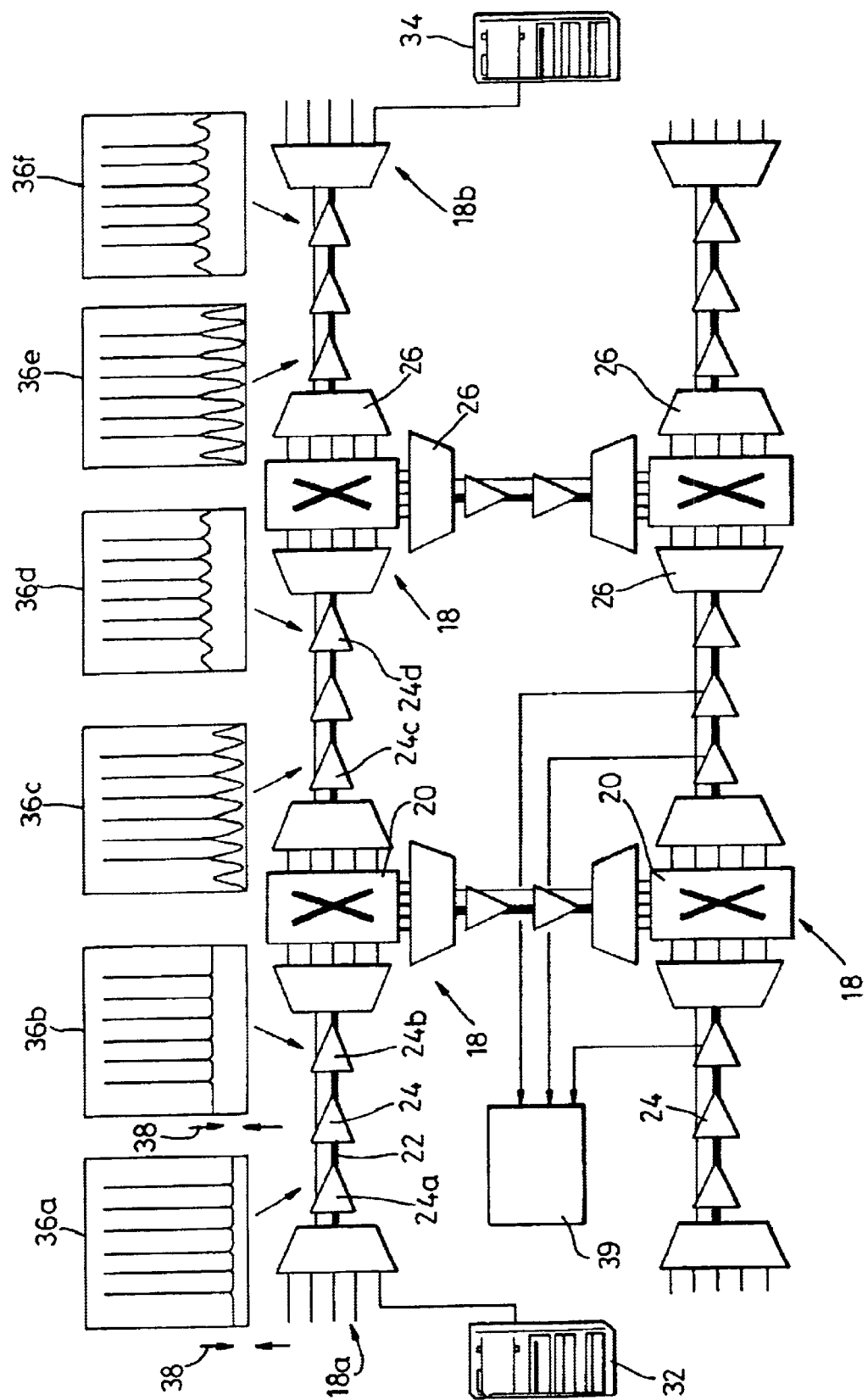
FIG. 1 shows an optical network to which the invention may be applied, and also shows the signal frequency spectrum at different locations in the network.

FIG. 1 shows a WDM optical communications network comprising a plurality of interconnected nodes 18, each node comprising an optical switching arrangement 20 for performing routing of signals across the network. The nodes are connected together by optical fibers 22 along which optical amplifiers 24 are placed. The fibers 22 carry WDM optical signals, and each node comprises multiplexing/demultiplexing units 26 which provide the channels of the WDM system on individual fibers to the switching arrangement 20. The switching arrangement may switch individual channels or else bands of channels.

The network enables equipment 32 at a source node 18a (not shown in full) to communicate with equipment 34 at a destination node 18b (not shown in full). The equipment 32, 34 is any device which provides optical signals for transmission over the network or which is provided for receiving signals from the network.

Each node 18 may be able to perform a regeneration function for some of the signals passing through the node. This involves conversion of the signal from the optical domain to the electrical domain, with subsequent conversion back into the optical domain. The regeneration function is typically carried out by transponders, which perform not only receiving and transmitting functions, but also enable wavelength translations to be carried out. This enables different sections of the selected path between the source and destination nodes to use different carrier frequencies, which may be required by the network management system, which allocates bandwidth to the communication paths.

Although FIG. 1 only shows the source and destination nodes as providing signals to, or taking signals from the network, each node of the network may also have add/drop capability.

FIG. 1 also shows the optical spectrum of the WDM signal carried by the fiber 22, at various locations through the network. Plot 36a shows the large spectral components at the channel frequencies, superimposed on a smooth noise floor 38. The plot 36a is the spectrum at the output of a first amplifier 24a, and the noise floor 38 represents noise introduced by the amplifier 24a, resulting from amplified spontaneous emission (ASE). As the signal passes through amplifiers 24, the noise floor 38 rises, and the plot 36b represents the spectrum at the output of amplifier 24b. Although the noise floor is shown as flat, it may be heavily shaped. For simplicity, the term "floor" is used in this text to describe any noise profile.

When the signals pass through a node 18, they undergo demultiplexing and multiplexing operations at the units 26. These operations result in shaping of the noise floor 38, and in particular filtering at the inter-channel frequencies. This is shown in plot 36c, which shows the output of amplifier 24c. As the signal propagates through further amplifiers, the noise level tends to increase as further ASE is added, as shown in plot 36d. For simplicity, a uniform increase in the noise floor is shown between plots 36c and 36d, although in practice the added noise will not generally be constant with respect to wavelength.

The noise undergoes further shaping as the signals pass through additional nodes 18, as shown in plot 36e, and the propagation through additional amplifiers 24 again increases the noise level as shown in plot 36f.

As described above, a known method of measuring the signal to noise ratio is to derive the channel noise level by analysing the inter-channel noise level. In the case of plots 36a and 36b, a simple interpolation between the inter-channel noise levels on either side of a channel will give an accurate estimation of the channel noise level. However, when there has been noise shaping, as in plots 36c to 36f, the noise no longer has a constant slope, so that linear interpolation between the inter-channel noise levels does not give an accurate indication of the channel noise level. Thus, the OSINR is not an accurate estimate of the OSNR. It is, however, desirable to obtain signal to noise ratio measurement using analysis of the spectral content at inter-channel frequencies, because measurement of the spectral content can be carried out relatively easily.

Figure 2:
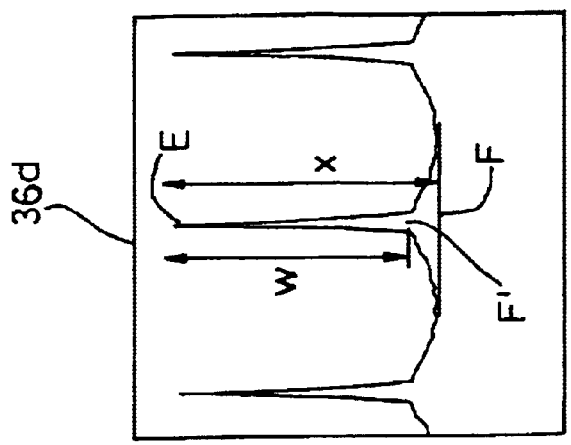
FIG. 2 is used to explain how the optical signal to noise ratio is derived.
Figure 2:
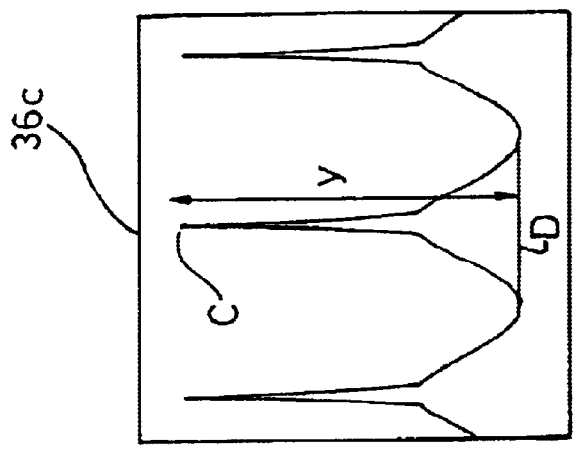
Figure 2:
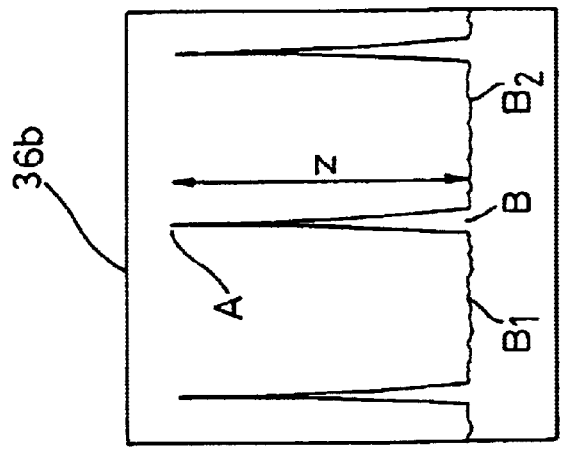

FIG. 2 shows in more detail plots 36b to 36d of FIG. 1, to explain the calculation process for evaluating the true optical signal to noise ratio. In order to determine the optical signal to noise ratio (OSNR) at a desired location within the network, for example at the output of amplifier 24d represented by plot 36d, the optical signal to inter-channel noise ratio (OSINR) upstream of the first node 18, for example at the output of amplifier 24b (represented by plot 36b), is first determined. This is derived from measurement of the channel signal level A and the channel noise level $B_1$ the latter being determined by interpolating the inter-channel noise levels $B_1$ and $B_2$ from each side of the channel. This is still an accurate determination at the amplifier 24b as no noise shaping has yet affected the optical signal so that $B=(B_1+B_2)/2$. The OSINR is represented as z in plot 36b. Then, the optical signal to inter-channel noise ratio (OSINR) is determined at the downstream output of the first node 18, in this example at the output of amplifier 24c. This is represented as y in plot 36c and is derived from the channel signal level C and the interpolated noise level D. The OSINR is also determined at the desired location, which in is example is the output of amplifier 24d. This is represented as x in plot 36d and is derived from the channel signal level E and the interpolated noise level F. Finally, the OSNR at the desired location, represented as w in plot 36d, is estimated from the channel signal level E and an estimated channel noise level F' which takes into account noise shaping.

The use of OSINR values enables the calculation of noise level to take into account the general attenuation (or gain) with the system. In other words, the noise shaping can not be determined only from measurements of inter-channel noise levels, but must also take into account attenuation across the frequency spectrum. The OSINR values take into account the signal levels at the channel frequencies, and thereby take account of this attenuation.

For the simplified case where the signal level at the channel frequency is the same at locations 24b, 24c and 24d, as shown schematically in FIG. 2, the estimated channel noise level F' is obtained as:

F'=B+(F−D), and the OSNR is obtained from E and F'. In practice, the OSINR values x, y, z enable the OSNR value w to be obtained even when the general signal levels are different at different locations. Of course, OSINR values do not need to be calculated, as the OSNR calculation can be derived from the signal measurement (A to F) without actually needing to calculate the OSINR values x, y, z.

Each optical amplifier in the network is provided with the apparatus for measuring inter-channel noise level and for measuring the channel signal level. By measuring the OSNR before any noise shaping occurs (at the upstream input of the first node), then measuring the OSINR at each subsequent amplifier, the amount of noise added to the signal by each subsequent amplifier can be determined, and the OSNR at each amplifier calculated.

Although not shown in detail in FIG. 1, the upstream and downstream amplifiers (for example 24b and 24c) may comprise part of the node itself, for example comprising a pre-amplifier and a post-amplifier.

Figure 3:
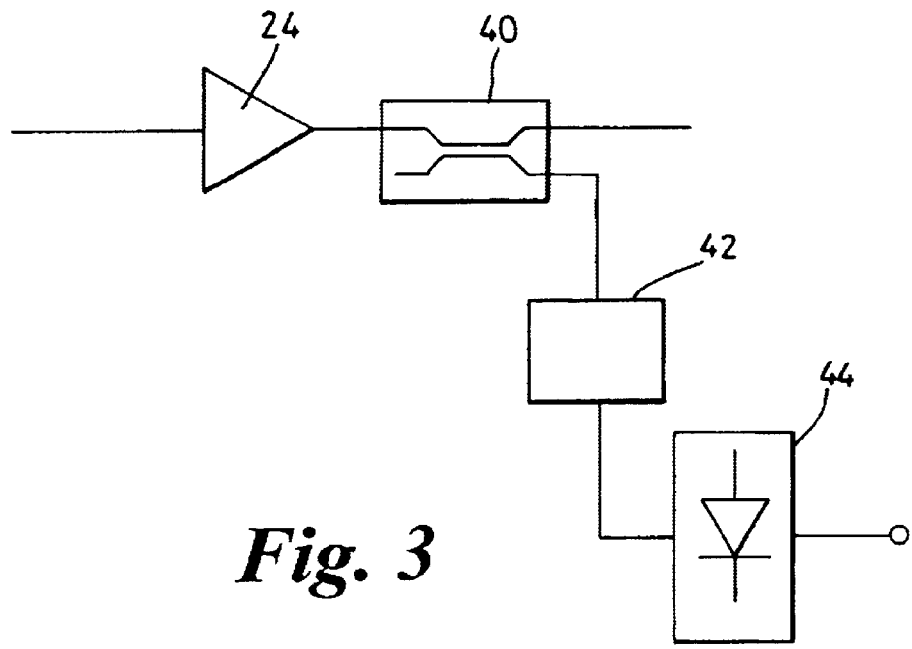
FIG. 3 shows optical analysis apparatus used in the network of the invention.

FIG. 3 shows schematically one possible apparatus enabling the signal level to be measured either at the channel frequencies or at the inter-channel frequencies. At the output of the amplifier 24, a splitter 40 is provided, which routes a proportion of the signal to a tuneable filter 42, the output of which is subjected to signal measurement, for example using a photodiode arrangement 44. Optical signal measurement may also be carried out using a Fabry-Perot interferometer sensor. Other optical spectrum analysis techniques will be well known to those skilled in the art, and the invention can be implemented by any such apparatus providing it can be tuned to measure signal levels at channel and inter-channel frequencies.

As discussed above, a parameter which is increasingly being used for representing the performance of optical networks is the Q value. This can be measured after conversion from the optical domain to the electrical domain, and is therefore easily carried out at regenerator sites, within the nodes 18.

Figure 4:
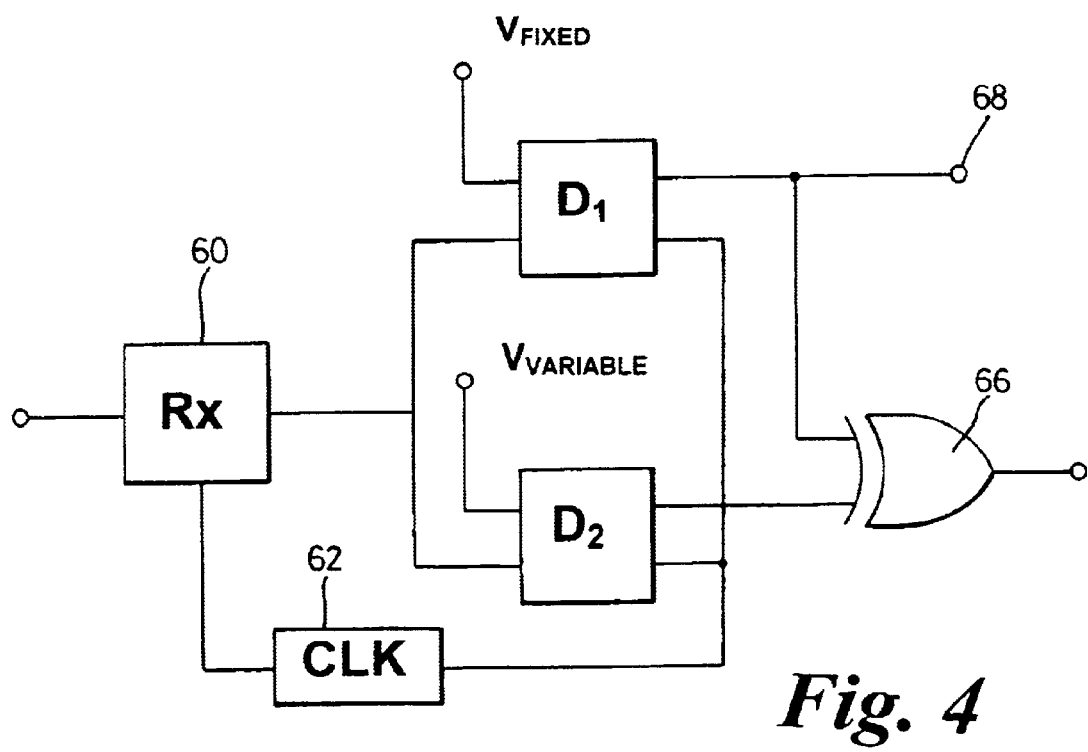
FIG. 4 shows Q measurement circuitry which can be used at the node sites.

FIG. 4 shows a possible Q measurement circuit which can be used at the regenerator site. The receiver 60 of a regenerator supplies the signal to a clock extraction circuit 62, which clocks the decision circuits of the Q measurement circuitry. The clock extraction circuit 62 can provide adaptive clock recovery, so that the error measurement is bit rate independent. The error ratio is obtained by comparing the measured signal from one decision circuit D1 (essentially a comparator) which uses a fixed decision threshold $V_{FIXED}$ (the normal operating point for the decision threshold of the channel) with the measured signal from another decision circuit D2 which uses a variable decision threshold $V_{VARIABLE}$.

The variable decision threshold scans various values, in known manner. The further the decision threshold is from the centre of the eye, the higher the error ratio that is measured.

The two measured signals are supplied to an XOR element 66 which provides an output pulse when the inputs are different. Each output pulse represents an error, which assumes the normal operating point $V_{FIXED}$ provides an error free signal, so that all differences to this are errors. The pulse rate is measured to obtain the BER (bit error ratio) for different decision threshold voltages. These BER values can be used to determine the Q value, essentially by a process of extrapolation, and this process will be well known to those skilled in the art. High error ratio counts are of course less accurate than low error ratio counts if the errors cross the normal decision threshold. However, in this case, there are still many more errors from the comparator with the offset threshold than the comparator with the normal threshold allowing the estimation of Q to remain reasonably accurate.

The output of the fixed threshold decision circuit provides the normal receiver output 68, which is then used to drive the transmitter of the converter, either at the same or a different optical frequency (depending on whether frequency translation is required).

This Q measurement circuitry can be provided at each node. However, the amplifiers 24 do not require optoelectric conversion, and therefore do not have the required receiver 60. However, the accurate knowledge of the optical signal to noise ratio at each amplifier site enables the Q value at that site also to be determined. This involves comparing the optical signal to noise ratio at the amplifier site with the OSNR at the preceding node, at which the Q value is known. The degradation of the OSNR can then be used to modify the Q value, to provide a reasonably accurate estimation of the Q value at the amplifier site.

It should be appreciated by those skilled in the art that the determination of the Q value throughout the network is entirely optional, and in many cases fault detection and location can be based solely on the optical signal to noise ratio calculations at each site within the network.

As will be apparent from the above description, the calculation of the OSNR at any location requires data to be provided to that location relating to signal measurements upstream and downstream of the nodes in the path of the signal to that location. This may be coordinated by a network management system, shown schematically as 39 in FIG. 1. The system receives inputs from all of the locations at which OSNR is required, and from all of the locations upstream and downstream of each node. Only three inputs to the network management system 39 are shown in FIG. 1 for clarity. The network management system includes software for performing the analysis of the inputs in order to calculate the OSNR at each location.

Alternatively, a distributed system may be implemented, by which each node passes on the measurements upstream and downstream of the node to the next node in the signal path. This information may, for example, be carried by the Optical Service Channel. In the distributed system, each amplifier site at which OSNR is to be calculated will include a processor apparatus having an input for receiving signal level data at frequencies both at and in-between the channel frequencies for locations immediately upstream and downstream of each node in the path of the optical signal and at the location at which the optical signal to noise ratio is to be measured. The processor will process the inputs to determine the OSNR at the location, taking into account the noise shaping of the multiplexing and/or demultiplexing device of the nodes in the path of the optical sign.

Various modifications will be apparent to those skilled in the art.

We claim:

1. A WDM optical network comprising a plurality of nodes, each node comprising an optical device at which multiplexing and/or demultiplexing operations are carried out, one or more optical amplifiers being provided between adjacent pairs of nodes, wherein a first apparatus for optical analysis is provided at the site of a first optical amplifier upstream of the first node, a second apparatus for optical analysis is provided at the site of a second optical amplifier at the downstream output of the first node, and a third apparatus for optical analysis is provided at the site of a third optical amplifier further downstream of the first node, where knowledge of the optical signal to noise ratio (OSNR) is desired, wherein the first, second and third apparatus are for measuring the signal level at frequencies both at and in-between the channel frequencies, and wherein signal levels at the channel frequencies and between the channel frequencies at the first, second and third apparatus are used to derive the OSNR at the third apparatus.

2. A network according to claim 1, wherein the change in optical signal to inter-channel noise ratio (OSINR) between the first, second and third apparatus is used to derive the OSNR at the third apparatus.

3. A network according to claim 1, wherein the optical device comprises an optical switching arrangement for the routing or forwarding of channels or groups of channels.

4. A network according to claim 1, wherein each apparatus for optical analysis comprises optical spectrum analysis apparatus.

5. A network according to claim 1, wherein each optical amplifier in the network is provided with apparatus for optical analysis, and wherein the noise shaping of all nodes is determined from the apparatus for optical analysis at the amplifier sites immediately upstream and downstream of each node.

6. A network according to claim 1, wherein the amplifier sites immediately upstream and downstream of a node comprise part of the node.

7. A network according to claim 1, wherein each apparatus for optical analysis comprises a tuneable filter and a signal measurement circuit.

8. A network according to claim 1, wherein each node is provided with apparatus for measuring a Q value of the optical signal.

9. A network according to claim 8, wherein the network further comprises apparatus for calculating the Q value at each amplifier site using the measured Q values at the nodes in combination the signal to noise ratios for the amplifier sites and the node sites.

10. A method of determining the optical signal to noise ratio at a location in a WDM optical network, the network comprising a plurality of nodes comprising an optical switching arrangement for the routing or forwarding of channels or groups of channels, the method comprising:
    measuring the optical signal levels at channel frequencies and at inter-channel frequencies upstream of each node;
    measuring the optical signal levels at channel frequencies and at inter-channel frequencies downstream of each node;
    measuring the optical signal levels at channel frequencies and at inter-channel frequencies at the desired location; and
    determining the signal to noise ratio at the desired location using the measured values thereby taking into account the noise shaping of the nodes.

11. A method according to claim 10, wherein the optical signal to inter-channel noise ratio (OSINR) is obtained upstream of each node, downstream of each node and at the desired location, and the signal to noise ratio is determined at the desired location using the OSINR values.

12. A method according to claim 11, wherein the noise level at the channel frequencies is obtained by interpolating from the signal levels at the inter-channel frequencies.

13. A method according to claim 10, wherein the Q value at the location is also calculated, the calculation comprising:
    measuring the Q value at the node upstream of the location;
    updating the Q value using the signal to noise ratio at the node upstream of the location and the signal to noise ratio at the location.

14. An optical node for use in a WDM optical network comprising a multiplexing and/or demultiplexing device, the node including a first optical amplifier at an input to the node and a second optical amplifier at an output of the node, wherein a first apparatus for optical analysis is provided at the site of the first optical amplifier and a second apparatus for optical analysis is provided at the site of the second optical amplifier, wherein the first and second apparatus are for measuring the signal level at frequencies both at and in-between the channel frequencies, and wherein outputs of the first and second apparatus are provided as outputs of the node for enabling the OSNR to be determined at a location downstream of the node, taking into account the noise shaping of the multiplexing and/or demultiplexing device of the node.

15. An apparatus for measuring the optical signal to noise ratio at a location in a WDM optical network, the network comprising a plurality of nodes, each node comprising a multiplexing and/or demultiplexing device, the apparatus comprising:
    an input for receiving signal level data at frequencies both at and in-between the channel frequencies for locations immediately upstream and downstream of each node in the path of the optical signal and at the location at which the optical signal to noise ratio is to be measured;
    a processor for processing the inputs to determine the OSNR at the location, taking into account the noise shaping of the multiplexing and/or demultiplexing device of the nodes in the path of the optical signal.

16. A network management system for determining the optical signal to noise ratio at locations in a WDM optical network, the network comprising a plurality of nodes, each node comprising a multiplexing and/or demultiplexing device, the system comprising:
    an input for receiving signal level data at frequencies both at and in-between the channel frequencies for locations immediately upstream and downstream of each node in the network and at locations at which the optical signal to noise ratio is to be measured;
    a processor for processing the inputs to determine the OSNR at the locations, taking into account the noise shaping of the multiplexing and/or demultiplexing device of the nodes.

17. A computer program product comprising a computer program embodied on a computer readable medium, the program comprising code means for carrying out a method of determining the optical signal to noise ratio at a location in a WDM optical network, the network comprising a plurality of nodes comprising an optical switching arrangement for the routing or forwarding of channels or groups of channels, the method comprising:
    measuring the optical signal levels at channel frequencies and at inter-channel frequencies upstream of each node;
    measuring the optical signal levels at channel frequencies and at inter-channel frequencies downstream of each node;
    measuring the optical signal levels at channel frequencies and at inter-channel frequencies at the desired location; and
    determining the signal to noise ratio at the desired location using the measured values thereby taking into account the noise shaping of the nodes.

* * * * *